United States Patent [19]
Kell

[11] 3,714,490
[45] Jan. 30, 1973

[54] LUMINESCENT SCREEN COMPRISING PHOSPHOR CORES LUMINESCENT IN FIRST COLOR AND PHOSPHOR COATINGS LUMINESCENT IN SECOND COLOR

[75] Inventor: Ray D. Kell, Princeton, N.J.
[73] Assignee: RCA Corporation
[22] Filed: Aug. 24, 1964
[21] Appl. No.: 391,565

Related U.S. Application Data

[62] Division of Ser. No. 108,534, May 8, 1961.

[52] U.S. Cl. ............313/92 R, 313/108, 313/92 PF
[51] Int. Cl. ......H01j 29/26, H01j 63/04, H01j 31/20
[58] Field of Search......117/33.5, 18, 100 I; 96/35 P; 313/92, 92 B

[56] References Cited

UNITED STATES PATENTS 1,365,976  1/1921  Frank ...................................250/77
2,864,771  12/1958  Switzer et al.......................117/100 I Primary Examiner—Robert Segal
Attorney—Glenn H. Bruestle

[57] ABSTRACT

A luminescent screen comprises a substrate and a layer of coated particles on said substrate, each coated particle comprising a base particle of a first phosphor luminescent in a first color and a coating on the base particle including a second phosphor luminescent in a second color.

6 Claims, 9 Drawing Figures

NONLUMINSCENT PROTECTIVE LAYER
RED PHOSPHOR PARTICLE LAYER
NONLUMINESCENT SEPARATOR LAYER
GREEN PHOSPHOR PARTICLE LAYER
NONLUMINESCENT SEPARATOR LAYER
BLUE PHOSPHOR BASE PARTICLE

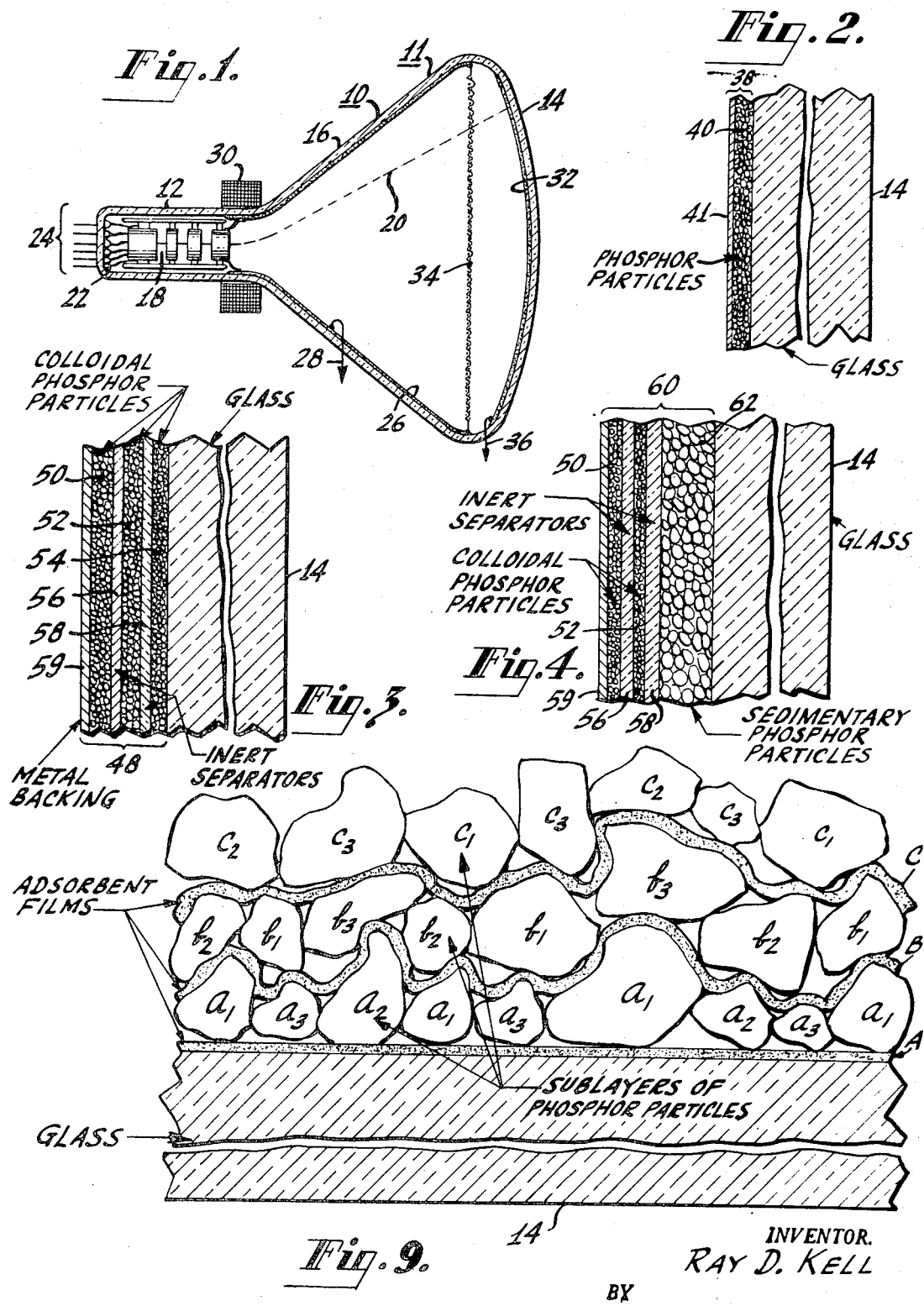

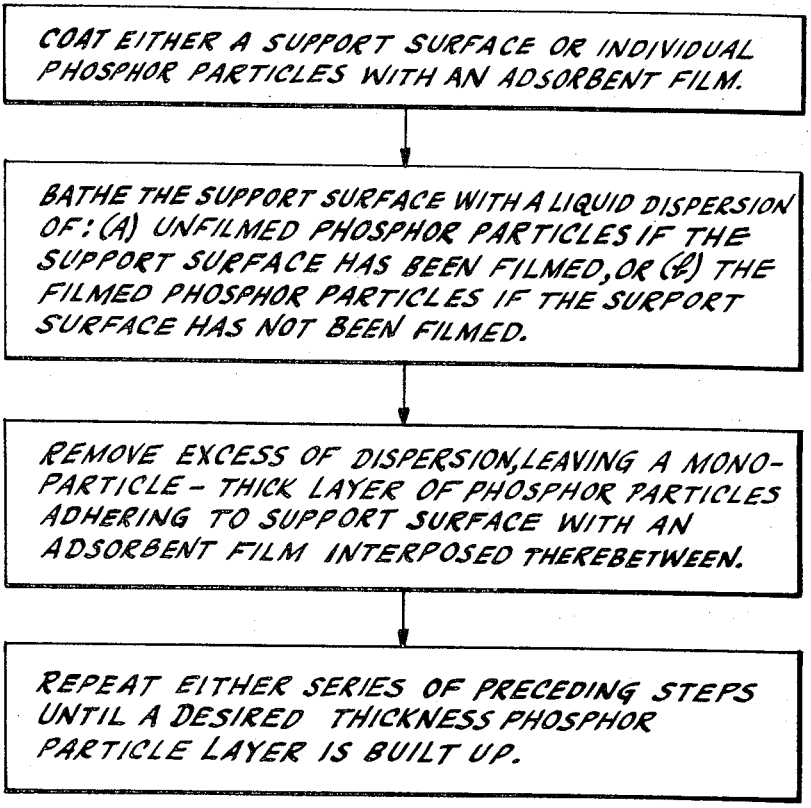

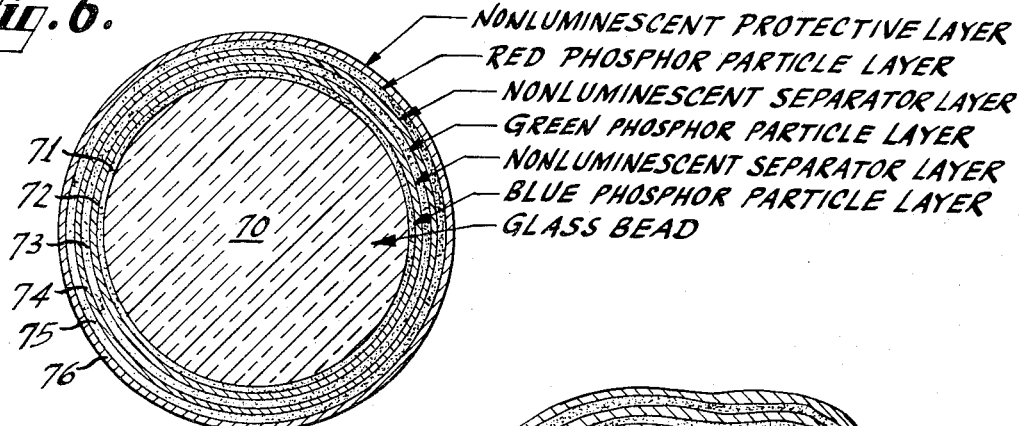
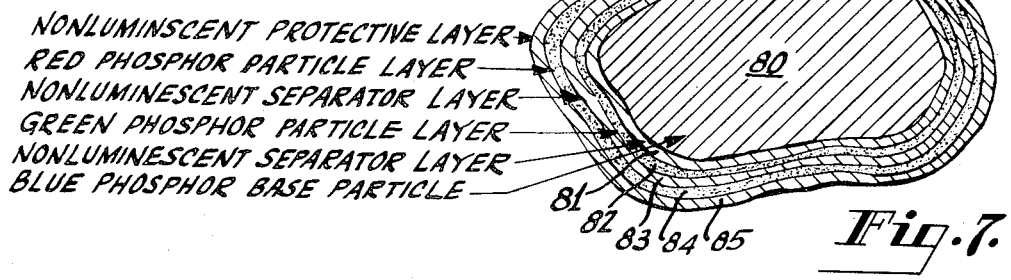
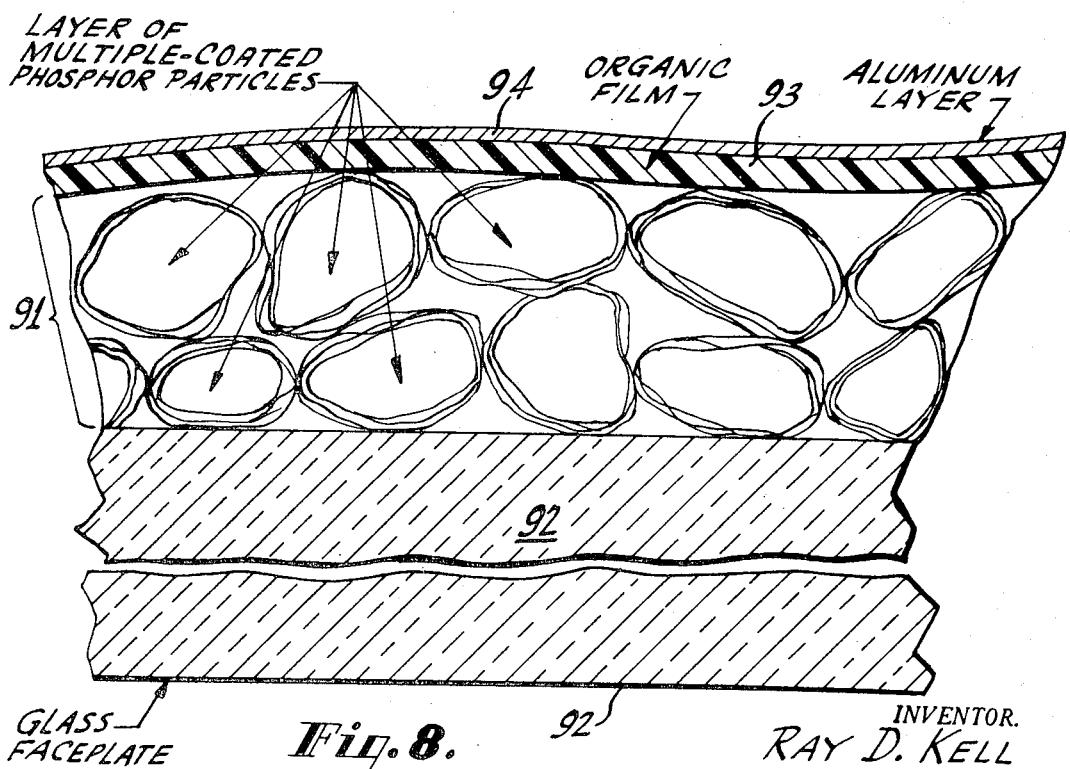

LUMINESCENT SCREEN COMPRISING PHOSPHOR CORES LUMINESCENT IN FIRST COLOR AND PHOSPHOR COATINGS LUMINESCENT IN SECOND COLOR

This is a division of my copending application, Ser. No. 108,535, filed May 8, 1961.

This invention relates generally to luminescent screens for electron tubes. The invention is particularly, although not exclusively, directed to very thin layers of colloidal phosphor particles.

In referring herein to colloidal-size particles, no limitation to a particular size range of particles is intended. Rather, the term "colloidal" is used herein in its broadest sense to mean a particle of such size that the surface properties are dominant over the mass properties, for example, where surface forces cause a particle to be suspended in a liquid which has a lower density than does the particle.

In some applications, extremely thin phosphor layers are desired. One type of cathode ray tube particularly demanding in this respect uses a luminescent screen composed of superimposed layers of different phosphors each of which emits light of a different color. In the operation of such a tube, selective penetration of electrons into the screen is obtained either by varying the velocity of a single electron beam or by using a plurality of different velocity beams to selectively excite the various phosphor layers to produce color images. Since color output is a function of screen penetration by the beam, the superimposed phosphor layers should be thin in order that screen penetration from one phosphor layer to another, and hence color selection, can be effected with a practical switching signal voltage. In addition to being thin, the screen layers for such a tube should be of uniform thickness and relatively nonporous in the sense that they should be substantially free of interstices, holes therethrough, or cavities therein. Where interstices, holes, or cavities do exist, or where the layer has a thin spot, some electrons of the beam may pass through one layer and excite the next, when in fact, this should not occur.

In addition to thin phosphor layers being useful in cathode ray tubes operating on the screen penetration principle to provide color images, thin phosphor layers are also useful in other tube applications. For example, tube applications which require high resolution displays such as image tubes and certain oscillograph tubes find such thin layers useful.

Evaporated phosphor layers have been proposed in an effort to provide nonporous, thin phosphor layers. However, evaporated phosphor layers are typically relatively low in light output efficiency. On the other hand the relatively highly efficient phosphor layers of sedimentary size particles, such as are commonly made by settling the particles through a liquid cushion and onto a support surface (substrate), are not suitable for such thin layers because of the relatively large size of the phosphor particles. The large size phosphor particles are themselves larger than the desired layer thickness. Moreover, such layers of sedimentary particles are inherently porous due to the large interstices between particles, which are loosely packed.

It is an object of my invention to provide new and improved thin, light transmitting luminescent screen comprising one or more layers of phosphor particles, which layers are characterized by relatively uniform thickness or surface-to-surface dimensions and nonporous texture, and which have relatively high light output efficiency.

It is also an object of my invention to provide a new and improved method of making luminescent screens which comprise one or more layers of tightly packed phosphor particles.

Briefly, according to one feature of my invention, a luminescent screen comprises at least one layer built up of one or more depositions of closely packed phosphor particles. The particles are caused to adhere to each other and/or to a support surface by extremely thin films such as gelatin films interposed therebetween. The screen is substantially free of interstices which are of the same order of size as, or larger than, the phosphor particles themselves, the layer being tightly packed and relatively nonporous. Moreover, because phosphor particles are used, rather than an evaporated film good light output efficiency is obtained. Also, by using colloidal-size particles, very thin layers which are light-transmitting can be made.

According to further features of the invention, luminescent screens suitable for use in penetration type cathode ray tubes may comprise a superimposed plurality of such phosphor particle layers in either: (1) extended layer form, or (2) multiple coated particle form. In extended layer screens, each of the superimposed phosphor layers extends completely over the faceplate of the tube. In screens of multiple-coated-particles the superimposed layers are formed as superimposed phosphor coatings on each of a multiplicity of relatively large particles of, for example, glass or other phosphor material, which particles are subsequently deposited in a layer over the faceplate.

Another feature of my invention is a method of laying down a layer of phosphor particles to provide a novel luminescent screen by the use of particle-adsorbent films to which phosphor particles will be attracted and adhere. Such a film is interposed between a support surface and phosphor particles which are to be formed into a layer on the support surface. The support surface may be that of a faceplate or large base particles on which the phosphor particles layer is to be formed. The method may, for example, be practiced either by forming such a film on the support surface and then bathing it with a liquid dispersion containing the layer-forming phosphor particles, or else the film may be formed on the layer-forming phosphor particles themselves and then the support surface bathed with a liquid dispersion of the filmed phosphor particles. In either case phosphor particles adhere to the support surface in a layer-like deposition.

According to one embodiment of the method of my invention, a support surface such as a glass faceplate is covered with such an adsorptive film. The film is then covered, such as by bathing, with a liquid dispersion of phosphor particles. This results in particles adhering to the film. The excess dispersion is then removed. These steps may be repeated any number of times to build up a layer of phosphor particles to any desired thickness.

In the drawings:

FIG. 1 is a longitudinal section of a cathode ray tube incorporating a luminescent screen;

FIGS. 2 and 3 are enlarged sections of single layer and multilayer screens, respectively, suitable for use in the tube of FIG. 1;

FIG. 4 is an enlarged section of a modification of the multilayer screen of FIG. 3;

FIG. 5 outlines a method of making the screens of FIGS. 1, 2, 3, and 4;

FIG. 6 is a section of a multiple-coated particle;

FIG. 7 is a modification of the multicoated particle of FIG. 6;

FIG. 8 is a section of a multilayer luminescent screen having FIG. 7 multicoated particles; and FIG. 9 is a greatly magnified section of a phosphor layer.

In FIG. 1, a cathode ray tube 10 comprises an envelope 11 including a neck 12, a faceplate 14, and an interconnecting funnel 16. An electron gun 18 in the neck 12 is adapted to project a beam 20 of electrons toward the faceplate 14. The neck 12 is closed at one end with a stem structure 22 through which a plurality of lead-ins 24 are sealed. Suitable operating potentials are supplied to the electron gun 18 through the lead-ins 24. A conductive coating 26 is provided on the internal surface of the funnel 16 and serves as an accelerating electrode. A suitable high voltage potential is supplied to the coating electrode 26 by a terminal means sealed through the funnel 16 and schematically represented by the arrow 28. A magnetic deflection yoke 30, for example, is provided for deflecting the electron beam 20 to scan a raster over the faceplate 14.

A luminescent screen 32 on the internal surface of the faceplate 14 comprises one or more layers of phosphor particles. The luminescent screen 32 may, for example, comprise a single layer of particles for producing either a single color light output or white light output. Alternatively, the screen may comprise a plurality of superimposed layers of preferably colloidal-size phosphor particles for producing light of different colors.

The present invention may be used in making luminescent screens of a variety of types, including screens for black and white cathode ray tubes and also screens for multicolor cathode ray tubes. The invention may, for example, be used in making luminescent screens of the type described in the copending application, Ser. No. 108,565, of D. H. Pritchard entitled "Electrical Devices and Methods" filed May 8, 1961.

Where a plural layer screen 32 is provided and is bombarded by electrons of different velocities, means may be provided for preventing raster size distortion. Such means may take the form of either a mesh 34 disposed transversely within the funnel 16 or other suitable means. Where the electrode 34 is used, it is connected to the coating electrode 26 and the tube 10 is operated according to post acceleration principles. A separate lead-in means as indicated schematically by the arrow 36 is provided for supplying suitable electric potentials to the plural layer screen 32 for effecting color selecting. In the case of a single phosphor layer screen 32, the electrode 34 may be either omitted or else included for the purpose of obtaining post acceleration operation and its attendant advantages.

FIG. 2 illustrates a luminescent screen 38 comprising a single layer 40 of phosphor particles which could be used in the tube 10. The layer 40 is characterized by having a thickness substantially greater than the size of the particles, thus resulting in a multiparticle-thick layer free of perforations. Because the particles are, in this example, of colloidal size, the layer 40 is very thin and has good light transmissivity. A light-reflective metal layer 41 of, for example, aluminum, is deposited on the phosphor layer 40.

FIG. 3 illustrates a 3-layer luminescent screen 48 which is suitable for use in the tube 10 for producing color images. The luminescent screen 48 comprises three superimposed layers 50, 52, and 54 of colloidal phosphor particles. The superimposed phosphor layers 50, 52, and 54 may be in contact with each other or alternated, as shown, with inert (nonluminescent) separator layers 56 and 58. The separator layers 56 and 58 may comprise, for example, powdered mica, vermiculite, colloidal silica, bentonite, kaolin, vanadium pentoxide, or talc. These separator layers may be put down in any one of a number of ways, such as in the manner hereinafter described for putting down the phosphor layers 50, 52, and 54. The separator layers 56 and 58 serve, among other things, to reduce color impurity of the light output. The screen 48 also includes a light-reflective metal backing layer 59 of, for example, aluminum.

A modification of the screen 48 is shown in FIG. 4 wherein like numbers are used to identify like parts of the screen 48 of FIG. 3. In FIG. 4 a luminescent screen 60 is shown disposed on the support member 14 and includes one or more relatively thin and nonporous colloidal particle layers 50 and 52 superimposed on a relatively thick powder phosphor layer 62 composed of larger-than-colloidal particles of, for example, sedimentary size. As in the screen 48 of FIG. 3 inert separator layers 56 and 58 are provided between adjacent phosphor layers, and a light reflective metal layer 59 is provided on the phosphor layer 50.

The screen 60 of FIG. 4 has, among other advantages, that of permitting a choice of screening techniques for the laying down of the first phosphor layer 62. For example, the well-known settling method can be used.

Because, in the operation of the tube 10, it is not necessary that the electron beam penetrate through the phosphor layer adjacent the faceplate, that layer need not be extremely thin or nonporous. The porosity of the coarse powder layer 62 may be higher than that of the two layers 50 and 52 nearest the electron gun of the tube.

In a luminescent screen of colloidal phosphor particles, good light output can be obtained from thin, yet nonporous, phosphor layers. For example, good light output has been obtained from a 3-layer screen 48 having a total thickness of a few microns.

In laying down a phosphor particle layer, I use adsorptive films of polymeric materials having protective colloid properties. Some examples of protective colloid materials which have been successively used are gelatin, polyvinyl alcohol, and certain modified starches such as that sold by Hercules Powder Company and designated by the trade name "Ceron-N." Many other materials are known which have protective colloid properties and which may be useful in practicing this invention.

The protective colloid, as employed in this invention, when applied to either (but not both) the phosphor particles or the substrate on which the particles are to be deposited, results in obtaining the desired degree of affinity and adhesion between the particles and the substrate.

CONTINUOUS EXTENDING LAYERS

FIG. 5 outlines a method for making a thin phosphor screen such as is illustrated in either of FIGS. 2, 3, or 4.

In accordance with the outline of FIG. 5, the adsorbent film can be interposed between the particles and their support surface either by: (1) the filmed substrate method whereby a support surface is coated with an adsorbent film and then bathed with a dispersion of unfilmed particles, or (2) the filmed particle method whereby each particle is coated with an adsorbent film and an unfilmed support surface is then bathed with a dispersion of the filmed particles.

Filmed Substrate Method

To make a single phosphor layer by the filmed substrate method such as the layer 40 of FIG. 2, an adsorbent film to which phosphor particles in a liquid dispersion will become attached is first provided on a support surface such as the glass faceplate 14. Such a film may be provided by introducing a quantity of a suitable material having protective colloid properties, e.g., a solution of gelatin in water, into the envelope 11 to thus bring it into contact with the internal surface of the faceplate 14 so that the faceplate is completely coated with a film of gelatin. The excess of the adsorbent-film-forming liquid is then removed from the envelope by pouring it off. After pour-off a very thin film of the liquid remains on the faceplate 14.

I have found a solution of approximately 0.1 per cent gelatin in water provides an excellent adsorbent film. I have obtained satisfactory results with a concentration as low as 0.01 percent and as high as 10 percent gelatin. When the concentration is made less than 0.01 percent, impractically large quantities of the gelatin solution are required. On the other hand, gelatin concentrations much greater than 10 percent present a processing problem because of stability and viscosity of the gelatin solutions.

The aqueous gelatin solution is preferably adjusted to a pH of about 4 with the addition of an acid. Various acids can be used; glacial acetic acid has been found to be suitable. The degree of acidity, i.e., the pH, has not been found to be critical, except that too strong an acidification, e.g., a solution with a pH of much less than 3, may be detrimental to some phosphor materials. The acid appears to increase the affinity of the adsorbent gelatin film for the phosphor particles which are subsequently brought into contact therewith.

Alternatively to, or in combination with, the adding of acid to the aqueous gelatin solution, an adsorbent film can be given an acid bath after it has been deposited on the support surface (faceplate 14). The acid bath may be performed by introducing a quantity of a suitable acid, for example acetic acid, into the envelope 11 and sloshing it over the adsorbent on the surface of the faceplate 14. The excess acid is then poured off.

Following the acid bath, or the acidified gelatin application as the case may be, a water bath step is used. Water is introduced into the envelope 11 and thoroughly sloshed over the filmed faceplate 14. The water is then poured off. The water bath step serves the purpose of removing surplus gelatin which is not in actual adherent contact with its support surface. Also, the water bath acts to remove excess acid left on the adsorbent gelatin film. After pour-off of the water bath, the faceplate 14 is preferably spun to throw off all excess water. The adsorbent film can be dried to set the gelatin if desired. However, this is not necessary.

Following the spinning off of the water, a dispersion of the desired phosphor particles in a suitable liquid such as water is introduced into the envelope 11 to bathe the gelatin filmed substrate. If desired, the phosphor dispersion may be acidified as hereinafter described. A sufficient quantity of the dispersion is used to insure good coverage of the filmed surface of the faceplate 14. When the film of the gelatin solution is covered with such a phosphor-in-water dispersion, phosphor particles become attached to the film in what is believed to be essentially a monoparticle thick deposition. Inasmuch as settling is not the principal action whereby the phosphor particles are deposited on the substrate, no harm results from agitation of the phosphor dispersion bath, and an agitated washing or bathing with the phosphor dispersion may be the most effective way to produce the most uniform deposit and thus be the preferred procedure. The method of my invention is distinguished from settling techniques in that the washing with the phosphor dispersion, whether agitated or not, is normally performed for a period of time, much less than would be required for a useful number of phosphor particles to settle out of the dispersion, even in the complete absence of any agitation.

Dispersion media other than water may be used, if desired. I prefer to use a phosphor-in-water dispersion containing submicron size phosphor particles in a concentration of approximately 10 to 30 milligrams of phosphor for each cubic centimeter of water to produce the desired adsorption action. Higher or lower phosphor concentrations than about 10—30 mg/cc can be used. Generally speaking, the more concentrated the phosphor dispersion the greater the rate of adsorption. Phosphor concentrations substantially less than 10 mg/cc result in undesirably slow adsorption rates; phosphor dispersion concentrations substantially greater than 30 mg/cc result in difficulties of centrifuging and redispersing the phosphor particles. Phosphor particles up to three microns in size and larger have been deposited in layers by the method of this invention.

After the phosphor dispersion has thoroughly contacted the adsorbent gelatin film, the excess dispersion is removed by pouring off. Following pour-off of the phosphor dispersion, the phosphor layer adhering to the adsorbent gelatin may be given a water wash to remove any excess phosphor material which is not in adherent contact with the adsorbent film.

The dispersion of phosphor particles should contain no appreciable amount of the adsorbent film-forming material, viz, gelatin in the process being described. If some of the adsorbent material were to be present in the dispersion, then the phosphor particles would become coated therewith. As a consequence, both the phosphor particles and the support surface (faceplate 14) would be similarly coated and present the same type surface. Thus, no adsorbent attraction would take place.

The processing steps as described above result in a thin gelatin film and a layer-like deposit of phosphor particles thereon. The layer of phosphor particles is substantially of monoparticle thickness and with a particle concentration, or density, of something less than complete coverage of the substrate unless the phosphor dispersion has been acidified. After a sufficient number of phosphor particles have been adhered to the gelatin film to produce a certain particle concentration, further phosphor deposition on the gelatin film substantially ceases. For some applications such a deposit of phosphor particles is sufficient. However, for other applications denser or thicker phosphor layers are preferred.

The particle density may be increased by adding to the above-described method a series of alternate acid and phosphor dispersion washes. Substantially complete coverage of the substrate can thus be obtained. Each acid wash acts to renew the affinity of the gelatin film for additional phosphor particles so that further adsorption can take place.

Acid washes with acetic acid solutions having a pH of about 4 may be used in making the alternate acid washes. I have further found that several, for example three or four, of such additional acid washes and phosphor dispersion washes appear to produce maximum density of the monoparticle thick phosphor deposit on the gelatin film. Additional alternate acid and phosphor dispersion washes deposit few, if any, phosphor particles onto the gelatin film.

As an alternative to the above-described alternate acid and phosphor dispersion washes, particle density may be increased by acidifying the original phosphor dispersion, i.e., giving it a pH less than 7, either before it is applied to the gelatin filmed substrate or while the dispersion is still in contact with the filmed substrate. For example, I have found a pH of about 5 to be suitable. Too great of an acidification of the dispersion, e.g., to a pH of much less than 3, may detrimentally affect the phosphor material. By this simplified procedure, a sufficient number of phosphor particles can be adsorbed from a single phosphor dispersion application to produce a dense monoparticle-thick phosphor particle sublayer of substantially the same density quality as that produced using a series of alternate acid and phosphor dispersion washes.

Thicker phosphor layers may be obtained by following either one of two procedures. For example, thickness of the layer may be built up by alternately repeating the gelatin and phosphor dispersion washes. Teachings regarding water washes and proper pH adjustment of the gelatin solution according to the method steps set forth above are followed.

Alternatively, the thickness of the phosphor particle layer may be built up in the form of superimposed sublayers of particles. By this alternative procedure, a dense monoparticle-thick sublayer is first laid down on a gelatin film by following either the alternate acid and phosphor dispersion wash steps or the simplified phosphor dispersion acidification procedure as described above. After one such sublayer has been laid down, it is given a water wash. A second gelatin film is then applied on top of the first sublayer and then a second dense phosphor particle sublayer is deposited onto the second gelatin film. This procedure may be repeated any desired number of times to superimpose any desired number of dense phosphor particle sublayers.

In order to insure adherence of the phosphor particles to each other and to their support surface after the resulting screen is finish-processed into a cathode ray tube, various alternative means can be employed. For example, the deposited phosphor layer or layers can be given a final wash with a silicate solution, e.g., a 2 percent potassium silicate solution. No subsequent water wash is necessary, or in fact desired, lest the silicate be removed. Alternatively, the phosphor layers can be washed with a gelatin hardener such as a small amount of 2 percent chrome alum or a 37 percent formaldehyde solution, after which the screen may be given a water wash. If desired, an additional coating of gelatin can be applied just before the formaldehyde or chrome alum wash.

Another alternative procedure for improving adherence is to apply to the substrate after application to the substrate of a phosphor dispersion wash and before application to the substrate of a subsequent additional gelatin solution wash a dispersion of extremely fine particles which are smaller than the phosphor particles being laid down. The extremely fine particles are preferably—though they need not necessarily be—luminescent and of the same phosphor as that of the phosphor layer being laid down. I have found that colloidal silica may be satisfactorily used for the extremely fine particles. Such fine particles are adsorbed by the gelatin film between the phosphor particles and act both to better secure the phosphor particles to the gelatin film and to improve packing. This procedure for improving adherence is particularly useful in combination with the above-described simplified procedure of phosphor dispersion acidification for obtaining dense monoparticle-thick sublayers. I have found that by acidifying a 30 mg/cc phosphor dispersion, substantially all of the phosphor particles will be removed therefrom and adsorbed on the gelatin film. Thus, a dispersion of the extremely fine particles, e.g., colloidal silica, can be applied to the thus resulting phosphor sublayer by leaving in contact with the substrate the dispersion medium (water) of the phosphor dispersion from which the phosphor particles were removed and dispersing therein a quantity of colloidal silica to provide the dispersion of extremely fine particles. This procedure for improving adherence can be used in lieu of, or in combination with, the above-described alternative procedure of washing with potassium silicate, chrome alum, or formaldehyde.

A specific example of making a screen of the continuous extending layer type by the filmed substrate method will now be described.

Four grams of gelatin are added to 400 milliliters of water. This is agitated and then allowed to stand for 30 minutes. The gelatin-water solution is then warmed to 60° C and maintained at this temperature for 15 minutes. This insures that the gelatin will be completely dissolved. This 1 percent gelatin solution is used either as is or is diluted as hereinafter specified.

A blue emitting phosphor layer of zinc sulfide activated with silver (such as used in the commercial color kinescope 21CYP22) is laid down on the faceplate as follows. Twenty grams of the blue phosphor is given two washes in separate 250 milliliter quantities of water. With each wash, the phosphor is agitated in the water, permitted to settle for a few minutes, the water and fine particles suspended therein decanted, and the remaining settled phosphor recovered for subsequent use. The recovered phosphor, together with 0.06 gram of sodium pyrophosphate is dispersed in another 250 milliliters of water. The sodium pyrophosphate serves to prevent agglomeration of the phosphor particles during a subsequent ball-milling thereof.

The phosphor dispersion is then subjected to a ball-milling for 72 minutes, then diluted with another 250 milliliters of water, and centrifuged at 1,800 RPM for 16 minutes. All particles below approximately 0.4 of a micron in diameter together with the excess of sodium pyrophosphate and water are discarded. Particles of approximately 0.4 to 5 or 10 microns are recovered from the centrifuged material for subsequent use.

Some of the 1 percent gelatin solution is adjusted by the addition of glacial acetic acid to bring the solution to a pH of approximately 4. A standard 21 inch rectangular faceplate panel is then coated with a film of this gelatin solution by covering it with the solution and gently tilting and spinning it to slosh the solution thereover. The gelatin coated faceplate is then washed with a flush of water. The gelatin coating step is then repeated to insure that the faceplate will receive a complete coverage with gelatin. This does not, however, act to provide a thicker gelatin coating on the faceplate.

The gelatin-coated faceplate is then covered with water to a depth of about 2 inches. Five grams of the centrifuged blue phosphor powder are dispersed in 500 milliliters of water and sprinkled over the surface of the water in the faceplate. This is allowed to set for about 15 minutes, then most of the water is poured off. The remaining water and phosphor particles are then agitated by sloshing the dispersion over the faceplate by gently tilting and spinning the faceplate.

After a layer of the blue phosphor particles is adhered to the gelatin-filmed faceplate, the phosphor layer is washed with water to remove all loose particles therefrom and then coated with a 2 percent potassium silicate solution to improve adherence. The faceplate is then set on its edge and allowed to dry at room temperature.

The above-described gelatin, phosphor, and silicate coating steps are repeated once so as to produce a desired thickness layer of the blue phosphor particles on the faceplate.

A first separator layer of vermiculite is then laid down on the blue phosphor layer as follows. Two-hundred fifty milliliters of standard commercial expanded vermiculite (such as that manufactured and sold by the Zonalite Company of Trenton, N.J., and designated Terra-Lite) is added to 250 milliliters of water and mixed in a "Waring" household-type blender for 30 minutes. The vermiculite-water mixture is then centrifuged for 10 minutes at 900 RPM. This leaves in suspension vermiculite particles, the largest of which have a mass equivalent to that of about 1 micron spheres. However, the vermiculite particles are actually flakes with the greatest dimension of the largest ones probably being about 10 microns. This suspension is then concentrated by further centrifuging for one hour at 1,800 RPM to produce a concentration of about 18 milligrams per milliliter.

The faceplate is then again washed with the 1 percent gelatin solution having a pH of about 4 and then with water as before. The faceplate is then covered with the vermiculite suspension and spun at about 150 RPM to provide a uniform depth of the vermiculite suspension over the surface thereof. After 15 minutes, the vermiculite suspension is removed and the faceplate is washed in water to remove all vermiculite particles not securely adhered to the gelatin film. Some particles of the vermiculite are, however, left adhering to the gelatin film on the blue phosphor layer. These steps of washing with gelatin solution, water, vermiculite dispersion, and water are repeated to provide 5 applications of vermiculite particles to produce a vermiculite layer having a total weight of about 0.17 milligrams per square centimeter.

A green emitting phosphor layer of zinc orthosilicate activated with manganese (such as used in the commercial color kinescope 21CYP22) is then laid down on the first separator layer as follows. Twenty-five grams of the green phosphor are added to 250 milliliters of water and ball-milled for 74 hours. This is then allowed to settle for 48 hours and the top three-fourths of the suspension removed for subsequent use. This produces a dispersion of green phosphor particles which are not larger than about one half micron in size.

The faceplate is then washed with a 0.1 percent gelatin solution and then given a water wash to remove all excess of the gelatin leaving a thin gelatin film thereon. The faceplate is then dried to set the gelatin, and then given another water wash, and spun to remove the excess water.

The faceplate is covered with the green phosphor suspension and agitated by spinning in a manner as hereinbefore described in providing the vermiculite layer. The excess of the green phosphor suspension is removed from the faceplate and the faceplate washed with water to remove loose nonadhering green phosphor particles.

The steps of washing with gelatin solution, water, green phosphor dispersion, and water are repeated to provide 6 applications of green phosphor particles to produce a layer having a total weight of about 0.29 milligrams per square centimeter. This green phosphor layer is then washed with a 2 percent potassium silicate solution and dried.

A second vermiculite separator layer is then applied to the green phosphor layer in the same manner as the first separator was applied to the blue phosphor layer, except that a 0.1 percent gelatin solution is used. Three applications of the gelatin and vermiculite particles are applied as before to produce a separator layer of about 0.14 milligrams per square centimeter. After the last application of vermiculite particles is made, the surface is washed with a 2 percent solution of potassium silicate.

A red emitting phosphor layer of zinc-magnesium-cadmium-silicate phosphor activated with manganese is then laid down on the second separator layer as follows: a 13.65 gram quantity of this red phosphor is mixed with 273 milliliters of water and ball-milled for 70 hours. This phosphor water mixture is allowed to settle for 96 hours and the top three-fourths recovered for subsequent use. This produces a dispersion of red phosphor particles which are not larger than about one half micron in size.

Six applications of gelatin and red phosphor each are laid down on the second vermiculite separator layer in a manner similar to that used in laying down the green phosphor layer. The six applications of the red phosphor particles produce a layer of about 0.35 milligrams per square centimeter. The red phosphor layer is then washed with a 2 percent solution of potassium silicate. The faceplate is then drained and dried at room temperature.

The faceplate having superimposed blue, green, and red phosphor layers is finally aluminized according to known techniques. A film of nitrocellulose is spread over the red phosphor layer by floating it on a pool of water and then decanting the water out from under it. A layer of aluminum is then evaporated onto the nitrocellulose film. The coated faceplate is then assembled into a finished cathode ray tube along with the other parts thereof and subjected to the usual bake-out and exhaust and other tube processing steps commonly employed in the industry.

Filed Particle Method

To make a single phosphor layer, such as the layer 40 of FIG. 2, by the filmed particle method there is first applied to each of the individual phosphor particles an adsorbent coating which will have an attraction to a support surface, such as the faceplate 14. The phosphor particles to be so filed may be bathed with a gelatin in water solution. The gelatin solution may be similar to that described in the laying down of particle layers by the filmed substrate method. The phosphor particles are agitated in the gelatin solution for a short period of time and then removed from the gelatin solution and thoroughly washed to remove all nonadhering gelatin therefrom. Each individual particle is coated with a thin film of gelatin.

The gelatin-filmed phosphor particles may then be deposited on a support surface such as the faceplate 14 by first dispersing the filmed phosphor particles in water and then bathing the faceplate 14 with the dispersion. Since the gelatin film on the particles is an adsorbent, the filmed particles will be attracted to and adsorbed by the support surface in a monoparticle thick layer thereon. The thorough washing of the filmed particles referred to above is to prevent excess non-adhering gelatin from contaminating the subsequent deposition dispersion. To allow such contamination would result in both the particles and the support surface being filmed with gelatin thus preventing a proper adsorptive attraction.

According to one example, a filmed particle sublayer is provided as follows. A 1.0 percent solution of gelatin in water is adjusted to a pH of 4 by the addition of glacial acetic acid. The phosphor particles to be filmed are placed in a container together with the gelatin solution and agitated for 10 to 15 minutes. The dispersion of the phosphor particles in the gelatin solution is then permitted to settle if the particles are sufficiently large. If the particles are too small to settle, the dispersion is centrifuged. The excess gelatin solution is thus removed from the container. The remaining particles are then thoroughly washed by agitating the particles in the container along with four or five separate quantities of wash water. The filmed particles are checked as to their freedom from all unadhering gelatin by using test samples thereof to determine if the particles, when dispersed in clean water can be adsorbed from the dispersion onto a clean support surface.

Each washing of the filmed particles is performed by dispersing the particles in an amount of water to provide a concentration of about 50 milligrams of filmed particles for each cubic centimeter of water. When a test of one of such dispersions results in good adsorptive action, the dispersion is then used for the application of the phosphor particles to a support surface by the filmed-particle adsorptive adherence method.

Modifications of the Methods

Because a phosphor layer may comprise sublayers of phosphor particles, in order to obtain a relatively uniformly thick phosphor layer, it becomes desirable to provide relatively uniformly thick sublayers. If the phosphor particles from which the sublayers are made range greatly in size, then a given sublayer may be relatively nonuniform in thickness. Should a thick portion, as provided by a relatively large particle, of one sublayer chance to exactly overlie a correspondingly thick portion of the adjacent sublayer, then a thickened portion of the resulting phosphor layer results. Although, statistically, the occurrence of such a possibility is low, such possibility can be minimized by providing the phosphor particles within a relatively small range of sizes. With respect to nonuniform layer thicknesses, the size range is such as to include large particles or small colloidal particles because the range of particle sizes is more important than the absolute particle sizes. The range of sizes of the phosphor particles is maintained within minimum practical limits. I have found particle layers to be of quite uniform thickness where a substantial portion of the smallest particles are not less than about one fourth the size of the largest particles. The practice of limiting the range of the particle sizes is applicable to either the filmed substrate or filmed particle methods of the invention.

In accordance with a modification of the method, both phosphor layer thickness uniformity and non-porosity can be improved. Such modification involves a change only in the step of bathing the support surface with the phosphor dispersion.

The support surface is first bathed with a first dispersion containing phosphor particles of given sizes. This bathing with phosphor dispersion is handled in the usual way as hereinbefore described. It may involve either the filmed substrate or filmed particle methods of the invention. After bathing with the first dispersion, the support surface is bathed with a second dispersion containing smaller phosphor particles than said given sizes. An acid wash may be used to promote adherence of phosphor particles from the second wash. Bathing with the smaller particle dispersion serves to fill in the interstices between the previously applied larger particles, thus reducing porosity and improving sublayer thickness uniformity. Because no adsorbent is applied to the support surface between the baths with the first and second dispersions, the smaller particles will adhere only where a large particle has not already adhered to the support surface. There will be substantially no build-up of the smaller particles on the larger particles.

In practicing this two-size-particle modification of my invention, the earlier described preferred practice of using a small range of particle sizes in the phosphor dispersion can be advantageously used with respect to both the first and second dispersions.

MULTIPLE-COATED PARTICLE LAYERS

The screens so far described have been of the extended-layer type, which comprise a phosphor layer extending continuously across an entire substrate or faceplate. In the case of multilayer screens for penetration-type cathode ray tubes, a plurality of such layers are superimposed. However, instead of forming multilayer screens in this way, they may, according to other features of this invention, be formed by first coating base particles (which serve as inner bodies), such as minute glass beads or particles of phosphor, with separator and other phosphor layers, and then depositing these coated base particles on the substrate in an extending continuous layer. Such screens, wherein phosphor layers are superimposed on individual particles, are, for some considerations, preferred forms of multilayer screens. Such screens may be referred to as multiple-coated-particle screens.

Luminescent screens for penetration-type kinescopes as herein disclosed, whether of the extended layer type or of the multiple-coated-particle type, may be considered as comprising a multiplicity of fractional areas of superimposed phosphor layers. In the case of multiple-coated particle screens, such a fractional area may comprise one or more of the multiple-coated particles.

FIG. 6 illustrates one form of luminescent material wherein glass particles are used as the bases for the several phosphor layers. The beads correspond to the support surface or substrate that was the base for screens hereinbefore described. The beads used may, for example, be about 40 microns in diameter. For example, in FIG. 6 a multiple-coated-particle comprises a glass bead 70 which has formed thereon, in the order named: a layer of a first phosphor 71, a first nonluminescent separator layer 72, a layer of a second phosphor 73, a second nonluminescent separator layer 74, and a layer of a third phosphor 75. The first second and third phosphors each emit light of a color different from the others. Thus, an elemental multilayer screen is formed on each bead. If desired, a third nonluminescent layer 76 may be applied over the outer phosphor layer 75 to protect the particles during subsequent handling and screen-making operations.

Instead of using a nonluminescent glass bead as the base and the support surface for the several phosphor layers, a phosphor particle itself can be used for this purpose. In such case, the base phosphor particle serves not only as the base support surface but is suitably chosen to serve also as the first phosphor layer, corresponding to the layer 71 of FIG. 6. This is illustrated in FIG. 7.

FIG. 7 shows a multiple-coated phosphor particle which comprises a particle 80 of a first phosphor which has formed thereon, in the order named: a first nonluminescent separator layer 81, a layer 82 of a second phosphor, a second nonluminescent separator layer 83, a layer 84 of a third phosphor, and a third nonluminescent layer 85 to serve as a protective coating. The particle 80 may, for example, be from 5 to 40 microns in size. Each of the three phosphors luminesces in a different color.

FIG. 8 illustrates a multilayer luminescent screen made of the multiple-coated phosphor particles of FIG. 7. Because of the relatively small size of FIG. 8, the plurality of coatings on the multiple coated particles thereof are represented schematically. The same general type of screen may be made from the multiple-phosphor-coated glass beads of FIG. 6.

The screen comprises a layer 91 of coated phosphor particles deposited on a substrate 92 such as a faceplate of a cathode ray tube. By way of example, the layer 91 is shown to have a thickness of substantially two particles. A screen thickness of two or more multiple coated particles reduces the possibility of nonluminescent area spots in the screen. Each multiple-coated particle forms in effect a minute multilayer screen complete in itself which constitutes a minute fractional area of the entire screen.

An organic heat-decomposable film 93 is laid down over the coated particles. This may, for example, be of nitro-cellulose or methyl methacrylate. An aluminum layer 94 is evaporated onto the film 93. The film 93 is then removed by volatilization and exhaust during tube bake-out and exhaust. The steps of providing the heat-decomposable film 93 and the aluminum layer 94 may be similar to those used in the manufacture of other kinds of cathode ray tubes.

The multiple coatings of either the coated glass beads 69 or the coated phosphor particles may be applied using the general steps of the methods as hereinbefore described. That is, the coatings may comprise layers of particles applied by the surface adsorption principle using films of protective colloids to provide the adsorption. Moreover, adsorption applied layer coatings on base particles may be applied by either the filmed substrate (base particle) or filmed particle methods of the invention.

The phosphor and separator material particle dispersions should contain particles of a substantially smaller size than the glass beads 70 or base phosphor particles 80. Preferably, the dispersions contain phosphor and separator particles of colloidal size, and base glass or base phosphor particles are of about 40 microns in size.

The steps of coating either the glass beads 70 or base phosphor particles 80 are essentially the same. The exception is that the glass beads 70 are given a first phosphor coating which is not necessary when phosphor particles themselves are used as the base and support surface for the multiple coating layers. The steps of applying the coatings are substantially the same as those used to lay down extending continuous layers directly on a faceplate except that the particle adsorption steps are carried out in a container other than the cathode ray tube bulb to be used for finished product.

An an example of making a multiple-coated-particle screen, the following description is detailed with respect to the production of the coated phosphor particles of FIG. 9. Although this invention is not limited to any particular order arrangement of the different phosphor layers, for convenience of description, a structure of blue-emitting phosphor base particle with green-emitting and red-emitting phosphor layers superimposed in that order will be described.

In such a structure, blue phosphor base particles are first put into a container and bathed with a particle adsorbing liquid, such as a gelatin in water solution. The mixture is agitated to wash the particles with the liquid; the particles are then allowed to settle; and the excess liquid is then poured off leaving a particle adsorbent film on the blue phosphor particles. The adsorbent film is acidified according to teachings hereinbefore set forth. The film coated base particles are then bathed or washed in water. The water wash may be repeated several times.

Next, the first separator layer is laid down on the blue phosphor base particles by a similar bathing or wash procedure. A suitable nonluminescent material such as silica or mica colloids dispersed in water is put into the container along with the filmed blue phosphor base particles. The materials in the container are agitated to coat the individual phosphor base particles with colloidal separator particles. The blue phosphor base particles are then allowed to settle and the excess separator dispersion is poured off. The blue phosphor base particles are then washed in water. Additional applications of separator particles, as desired, may be laid down to increase the separator layer thickness. This is done by again bathing the blue phosphor particles successively in the particle adsorbent liquid, water, the separator dispersion and water. As hereinbefore detailed, either a plurality of alternate acid and phosphor dispersion washes or the simplified phosphor dispersion acidification procedure may be used to produce dense sublayers of the phosphor deposits.

When the first separator layer is thick enough, the green phosphor coating layer is applied on the first separator layer of the blue phosphor base particles. This is done in a manner similar to that by which the first separator layer was applied. The blue phosphor base particles are subjected to a series of agitated washings in baths of the particle adsorbent liquid, water, a dispersion of colloidal size green phosphor particles, and water. Sufficient number of applications of green phosphor particles are thus applied (if desired, procedures hereinbefore detailed to obtain dense sublayers may be used) to build up the green phosphor layer to a desired thickness.

The second separator layer is then laid down over the green phosphor layer in a way similar to that in which the first separator layer was laid down.

Next the red phosphor layer is formed on each individual coated particle. The red phosphor layer is laid down over the second separator layer in a way similar to that in which the green phosphor layer was laid down over the first separator layer. After the final application of red phosphor particles, the coated blue phosphor base particles are washed in water to remove any remaining loose red phosphor colloids. This final wash step may be repeated a number of times, if desired.

After the final application of red phosphor material has been made, the coated particles may be given a final treatment to insure adherence of the phosphor particle layers. This may be done by washing the coated particles with a solution of formaldehyde, chrome alum, or potassium silicate as hereinbefore detailed. Alternatively, a final coating of the nonluminescent separator material may be applied over the red phosphor layer. Either the hardened gelatin or nonluminescent separator material coating serves to avoid any washing away of the red phosphor layer in the subsequent process of putting the coated particles on a faceplate. Steps used to improve phosphor particle adherence as hereinbefore described may optionally be performed at various times throughout the process of applying the particle coatings to the base particles.

After the final coating has been provided, the multiple-coated particles are deposited on the faceplate of a cathode ray tube in any one of a number of ways. For example, they may be applied by either slurry or settling techniques. Then, the layer of multiple coated particles may be filmed and aluminized as shown in FIG. 8.

The coated particles may be stored either wet or dry until it is desired to put them on a faceplate. If stored wet, they simply remain in some of the final wash water. If stored dry, the water is decanted and they are simply dried at, for example, room temperature.

One specific example will now be described for preparing multiple-coated phosphor particles:

Blue-emitting zinc sulfide sulfide phosphor activated with silver (commercially designated as P7) is used for the base particles on which subsequent phosphor coatings are to be applied. This phosphor material has a size distribution of about 5 to 20 microns. Fifty grams of this material are washed in water and allowed to settle. The wash water together with any extraneous material suspended therein is discarded to leave only the desired 5–20 micron particle size material.

These 50 grams of the blue phosphor particles are then placed in a bottle together with a quantity of 0.1 percent gelatin-in-water solution having a pH of 4. This is agitated for 10 to 15 minutes and then allowed to settle for about 5 minutes. The gelatin solution is then poured off leaving the wet blue phosphor particles with a gelatin film thereon. The gelatin filmed particles are then given three separate water washes in the bottle to rid them of nonadherent gelatin material.

A first silica separator layer coating is then applied to the base blue phosphor particles as follows:

A dispersion of colloidal silica in water which has been adjusted to a pH of 4 with glacial acetic acid is poured into the bottle containing the filmed particles. The silica in water dispersion is of a concentration of 33 milligrams of silica for each milliliter of water. The container is agitated for 10 to 15 minutes and the blue phosphor base particles then allowed to settle for about 5 minutes. The silica-in-water dispersion is poured off and the blue particles washed three times to remove all nonadherent silica therefrom. A deposit of colloidal silica particles is left adhering to the gelatin-filmed blue phosphor particles. The successive washing of the blue phosphor particles in baths of gelatin solution, water, silica dispersion, and then water is repeated six times to build up a layer of colloidal silica particles of about 0.2 milligrams per square centimeter.

The silica coated blue particles are then coated with a layer of green emitting zinc orthosilicate, magnesium activated phosphor as follows:

A suspension of the green phosphor as described in the making of extending layer screens is first centrifuged to leave in suspension particles up to 0.8 microns in size. This remaining suspension is selected and then further centrifuged to provide a concentration of about 20 milligrams of phosphor per milliliter of water. Six applications of green phosphor particles are then laid down on the silica coated blue particles by repeating a series of gelatin solution, water, green phosphor dispersion, and water washes in a manner generally similar to the steps used in laying down the first silica separator layer. A layer of green phosphor particles having a total weight of about 0.3 milligrams per square centimeter is thus provided.

A second separator coating of colloidal silica is then deposited on the green phosphor layer. The procedure is generally the same as was used to deposit the first silica separator layer on the blue base particles, with the exception that the silica-in-water suspension is adjusted to a pH of 5.5 and 8 applications are applied to produce a colloidal silica layer of about 0.2 milligrams per centimeter.

A red phosphor layer is then laid down on the second silica separator layer using a suspension of zinc-magnesium-cadmium silicate phosphor activated with manganese as described with reference to the making of continuous extending layer screens. The base particles are successively washed by successively introducing into the bottle, agitating and removing, washes of a 0.1 percent gelatin solution having a pH of 4, water, the red phosphor suspension, and water. Six applications of the red phosphor are made to produce a layer of about 0.4 milligrams per square centimeter.

As a final coating, the base blue phosphor particles are washed in a gelatin solution and then in a colloidal silica dispersion to provide a thin layer of silica thereon.

Multiple-coated particle screens offer a number of advantages. For example, the process of preparing the multiple phosphor layers need not be performed in the tube fabrication plant. Thus, tube fabricating per se is greatly simplified. The coated particles can be made beforehand and a quantity maintained on hand for use in tube manufacturing. Thus, because the phosphor layer processing is separated from the tube fabrication process, a breakdown of one does not necessarily affect the other. Moreover, these separate processes can be carried out simultaneously thus lessening the complete fabrication time of a finished tube. Moreover, if desired, existing facilities used in the manufacture of black and white cathode ray tubes may be used for laying down the coated particles.

Another advantage of multiple-coated-particle screens is the ease with which they can be made to provide color emission uniformity during operation of the tube. Multiple-coated-particles can be easily made with good phosphor layer thickness uniformity from coated particle to coated particle. This thickness uniformity is in turn provided over the entire area of a screen which is made of the multiple-coated-particles.

In phosphor layers prepared by the method of FIG. 5, the particles are essentially in contacting relation with each other. No substantial amount of binder material exists between particles. The adsorbent films are extremely thin, even compared to colloidal phosphor particles, and constitute negligible percentages of the total mass of the phosphor layer.

Laboratory examination of both a sublayer of colloidal phosphor particles and an adsorbent gelatin film has indicated that the film thickness is a very small fraction by weight of the phosphor sublayer. The adsorbent films are believed to be less than about 100 Angstroms thick.

FIG. 9 is illustrative of all or a part of a phosphor layer built up of superimposed dense monoparticle-thick sublayers. The phosphor layer may, for example, constitute all or part of the layer 40 of FIG. 2 or the layer 54 of FIG. 3. As shown in FIG. 9, the layer comprises three adsorbent gelatin films alternated with three dense phosphor particle sublayers of the same phosphor material which have been laid down by the filmed substrate method using alternate acid and phosphor dispersion washes.

In laying down the layer of FIG. 9, an adsorbent gelatin film A is first provided on the substrate 14, shown specifically in FIG. 6 as a faceplate. A subsequent bathing of the adsorbent film A with a dispersion of phosphor particles will result in the phosphor particles $a_1$ adhering thereto. A subsequent acid wash and then a second washing with the phosphor dispersion as hereinbefore described will result in the phosphor particles $a_2$ adhering to the gelatin film A. Likewise, phosphor particles $a_3$ will be deposited on the gelatin film A by a third phosphor dispersion wash after a second acid wash. Such alternate acid and phosphor dispersion washes are repeated until substantially no additional phosphor deposit occurs. The result is a relatively dense monoparticle thick sublayer of phosphor particle $a_1$–$a_2$–$a_3$, etc. which provides a substantially complete coverage of the adsorbent gelatin film A. In similar manner, the adsorbent gelatin film B is deposited on this first sublayer of phosphor particles $a_1$–$a_2$–$a_3$ and a second monoparticle thick sublayer of phosphor particles $b_1$–$b_2$–$b_3$ is adhered to the adsorbent film B. These steps are again repeated to provide the adsorbent gelatin film C and the third sublayer of phosphor particles $c_1$–$c_2$–$c_3$. If a thicker phosphor layer is desired, additional dense sublayers may be superimposed on the sublayer $c_1$–$c_2$–$c_3$.

The uniformity of thickness and degree of packing of the particles of a layer of a given thickness can be stated in terms of the electron velocity voltage at which bombarding electrons begin to pass completely through the layer. This velocity may be defined as the threshold penetration velocity voltage.

Generally speaking, the electron penetrability of a given layer is dependent upon the layer's average mass thickness (the product of the average mass-density and the average thickness of a relative large area portion of the layer). Mass-density (hereinafter referred to simply as density) of a layer is determined by the kind of the material of the layer and by its packing (the ratio of volume of material to volume of space). A layer which has no spaces between particles thereof may be termed a perfectly packed layer. Such a layer might be formed, for example, by solidification of a molten mass of the material in question. Perfectly packed layers which are further characterized by substantially perfect thickness uniformity may be defined as layers of substantially perfectly uniform mass thickness. The ordinary evaporated, light-reflective aluminum layer, commonly used in cathode ray tubes, and gold or aluminum foils are examples of layers which have a substantially perfectly uniform mass thickness.

When the average characteristics of relatively large areas of two layers are considered, a nonuniformly thick, loosely packed layer will impede the penetration of electrons to the same degree or absorb the same amount of energy from penetrating electrons, as a uniformly thick tightly packed layer, if the two layers have the same average mass thickness. However, this does not hold true when elemental areas of the layer are considered. As used herein, an elemental area is an area portion of a layer that has throughout its own area a perfectly uniform mass thickness. In particle layers, an elemental area is of the order of particle dimension or less in size. In perfectly packed layers, such as gold foil, elemental areas approach molecular dimensions in size.

Loosely packed layers are nonuniform in density, having some elemental areas where the density of the layer is greater than the average density of the layer and some elemental areas where the density is less than the average density of the layer. Similarly, nonuniformly thick layers have some elemental areas of greater than the average thickness and some elemental areas of less than the average thickness. Both these types of nonuniformity, where they exist, contribute to nonuniformity of the mass thickness of a layer. That is, the layer has some elemental areas where the mass thickness is greater than the average mass thickness of the layer and some elemental areas where the mass thickness is less than the average mass thickness of the layer. When an electron strikes a layer at one of the elemental areas of lesser mass thickness, it may pass completely through the layer even though an electron of the same velocity might not pass through a layer of the same average, but uniform, mass thickness. Increasing the thickness of a particle layer increases both the absolute value of its threshold penetration voltage and also the ratio of its threshold penetration voltage to that of a layer of the same average but perfectly uniform mass thickness.

This is because the nonuniformity of the layer due to less than perfect packing is, by making the layer thicker, evened out by a statistical distribution of the spaces between phosphor particles. However, in order to give satisfactory service in a plural layer luminescent screen of penetration-type cathode ray tubes, the individual phosphor layers should be relatively thin in order to permit color selection at the least possible voltage differences and at the same time be sufficiently uniform in mass thickness so as to minimize color impurity. It has been found that such phosphor layers preferably should be thin enough that they have a threshold penetration voltage no greater than about 10 kilovolts and yet be of sufficiently uniform mass thickness that their threshold penetration voltage is at least half that of a layer of the same average but perfectly uniform mass thickness. Phosphor particle layers may be laid down according to my invention which exhibit threshold penetration voltages which are only about 5 kilovolts, for example, and yet which are from about two-thirds to three-fourths that of a layer of perfectly uniform mass thickness. Comparing phosphor layers having equal average mass thicknesses of a given value: whereas a layer of perfectly uniform mass thickness may have a threshold penetration voltage of about 8.8 kilovolts; a layer according to my invention may have a threshold penetration voltage of about 6 kilovolts; and a prior art settled layer may have a threshold penetration voltage of only slightly greater than zero kilovolts.

There have been made and successfully operated multicolor luminescent screens of both the extended layer type and the multicoated-particle type and monochrome screens of the extended layer type, I have used both the filmed particle method and the filmed substrate method in making such screens. In each case I have obtained screens which: have exhibited satisfactory adherence; have been satisfactorily used in cathode ray tubes; have successfully subjected to standard tube processing procedures such as bake-out, envelope sealing, and aging; and have given good operational results and satisfactory light output.

The invention has been described in terms of specific examples and embodiments. However, various changes and modifications may be made therein without departing from the spirit and scope of the invention as defined by the following claims.

What is claimed is:

1. A luminescent screen comprising a substrate and a layer of coated particles on said substrate, each of said coated particles comprising a base particle and a coating layer of phosphor thereon and wherein: each of said base particles has a plurality of superimposed phosphor coating layers thereon, each of said phosphor coating layers comprises a plurality of superimposed sublayers of colloidal phosphor particles which luminesce in a color different from the other coating layers, said base particles are particles of a phosphor which luminesce in a color different from the colors in which said phosphor coatings luminesce, and said base phosphor particles are substantially larger than said colloidal phosphor particles.

2. A luminescent screen comprising a substrate and a layer of coated particles on said substrate, each of said coated particles comprising a base particle of a first phosphor which luminesces in a first color and a coating on said base phosphor particle which includes a second phosphor which luminesces in a second color.

3. A luminescent screen according to claim 2 and wherein said coating comprises a plurality of superimposed layers of phosphor particles, each of which layers luminesces in a color different from the others and from said base phosphor particle.

4. A luminescent screen comprising a substrate and a layer of coated particles on said substrate, each of said coated particle comprising a base particle of a first phosphor which luminesces in a first color and having the following superimposed coating layers thereon in the order named; a first layer of nonluminescent colloidal particles, a layer of colloidal particles of a second phosphor which luminesces in a second color, a second layer of nonluminescent colloidal particles, and a layer of colloidal particles of a third phosphor which luminesces in a third color.

5. In a color television picture tube, including a screen end and gun means for directing electrons of differing velocities toward said screen end, a luminescent screen at said screen end of said tube, said screen comprising coated particles, individual ones of at least some of said coated particles comprising an inner body of a first phosphor which luminesces in a first color, and a plurality of successive coatings each of which surrounds said body on all sides, said coatings including a first coating of nonluminescent material, a coating of a second phosphor which luminesces in a second color, another coating of noluminescent material outside said last-mentioned phosphor coating, a coating of a third phosphor which luminesces in a third color, said coated particles being adapted when struck by said electrons to produce light the color of which is controlled by the velocity of said electrons, the thickness of said inner body being greater than the thickness of any of said coatings and also great enough to prevent said electrons from passing through said inner body and penetrating its layers on the side away from said gun means.

6. Energy responsive phosphor coated articles comprising:

translucent beads of substantially uniform size; and phosphor particles, of substantially smaller size than said translucent beads, adheringly disposed in a bonded manner upon the exterior of said beads to provide individually thereon a substantially continuous and contiguous peripheral coating of luminescent material.

* * * * *